(12) United States Patent
Chen et al.

(10) Patent No.: US 12,013,736 B2
(45) Date of Patent: Jun. 18, 2024

(54) POWER SUPPLY SYSTEM AND METHOD OF CONTROLLING THE SAME

(71) Applicant: CHICONY POWER TECHNOLOGY CO., LTD., New Taipei (TW)

(72) Inventors: Chin-Pin Chen, New Taipei (TW); Yu-Jen Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 62 days.

(21) Appl. No.: 18/076,865

(22) Filed: Dec. 7, 2022

(65) Prior Publication Data
US 2023/0409096 A1    Dec. 21, 2023

(30) Foreign Application Priority Data
Jun. 21, 2022   (TW) .................................. 111122991

(51) Int. Cl.
*G06F 1/26*   (2006.01)
(52) U.S. Cl.
CPC .................................. *G06F 1/263* (2013.01)
(58) Field of Classification Search
CPC ........ G06F 1/263; G06F 1/30; H02M 1/0009; H02M 1/0025; H02M 1/325; H02M 3/1584; H02M 3/285
See application file for complete search history.

(56) References Cited

U.S. PATENT DOCUMENTS

| 6,642,631 | B1 * | 11/2003 | Clavette | .................. | H02J 1/102 |
|   |   |   |   |   | 323/282 |
| 2005/0073783 | A1 | 4/2005 | Luo et al. |   |   |
| 2010/0270863 | A1 * | 10/2010 | Togare | .................... | H02J 1/102 |
|   |   |   |   |   | 307/80 |

(Continued)

FOREIGN PATENT DOCUMENTS

| CN | 103580450 A | 2/2014 |
| CN | 107370387 A | 11/2017 |

(Continued)

OTHER PUBLICATIONS

Office Action dated May 19, 2023 of the corresponding Taiwan patent application No. 111122991.

*Primary Examiner* — Jaweed A Abbaszadeh
*Assistant Examiner* — Brian J Corcoran
(74) *Attorney, Agent, or Firm* — MUNCY, GEISSLER, OLDS & LOWE, P.C.

(57) ABSTRACT

A power supply system includes a plurality of power modules for supplying power to a load, and each power module provides an output current according to a modulation signal, and provides the output current to a power bus through an output end and supply the output current to the load through the power bus. Each power module is connected to a common-connected point of a signal bus to generate a second voltage level, acquires a first ratio according to a full-load output power of the conversion circuit corresponding to the controller and the full-load output power of the (Continued)

power module capable of outputting the maximum power, adjusts the first voltage level according to the first ratio and the second voltage level to adjust the amplified signal by adjusting the first voltage level, and adjusts the output current to a target value corresponding to the first ratio by adjusting the amplified signal.

10 Claims, 5 Drawing Sheets

(56) References Cited

U.S. PATENT DOCUMENTS

| | | | |
|---|---|---|---|
| 2013/0049712 A1 | 2/2013 | Ueno | |
| 2014/0111008 A1* | 4/2014 | Hardik | H02J 1/102 307/23 |
| 2017/0229861 A1 | 8/2017 | Kawamoto | |
| 2017/0346297 A1* | 11/2017 | Chuang | H02J 4/00 |

FOREIGN PATENT DOCUMENTS

| | | |
|---|---|---|
| CN | 111864722 A | 10/2020 |
| TW | M458025 | 7/2013 |
| TW | M463938 | 10/2013 |
| TW | 201436408 A | 9/2014 |
| TW | 201436409 A | 9/2014 |
| TW | 201739139 A | 11/2017 |
| TW | 201742346 A | 12/2017 |
| TW | I713495 B | 12/2020 |
| WO | 2016121434 A1 | 8/2016 |
| WO | 2020243655 A1 | 12/2020 |

\* cited by examiner

| | total demand current (A) | target output current (A) of 650 watts | actual output current (A) of 650 watts | amount of error (%) | target output current (A) of 1200 watts | actual output current (A) of 1200 watts | amount of error (%) | specification (%) |
|---|---|---|---|---|---|---|---|---|
| 100% | 154 | 54.11 | 55.4 | 2.39% | 99.89 | 99.3 | 0.59% | 5% |
| 90% | 138.6 | 48.7 | 49.8 | 2.26% | 89.9 | 89.4 | 0.56% | 5% |
| 80% | 123.2 | 43.29 | 44.2 | 2.11% | 79.91 | 79.4 | 0.64% | 5% |
| 70% | 107.8 | 37.88 | 38.4 | 1.38% | 69.92 | 69.3 | 0.89% | 5% |
| 60% | 92.4 | 32.46 | 32 | 1.43% | 59.94 | 60.1 | 0.28% | 5% |
| 50% | 77 | 27.05 | 26.2 | 3.16% | 49.95 | 50.4 | 0.91% | 5% |
| 40% | 61.6 | 21.64 | 20.9 | 3.43% | 39.96 | 40.4 | 1.11% | 20% |
| 30% | 46.2 | 16.23 | 15.5 | 4.51% | 29.97 | 30.4 | 1.44% | 20% |
| 20% | 30.8 | 10.82 | 10.2 | 5.74% | 19.89 | 20.3 | 1.61% | 20% |
| 10% | 15.4 | 5.41 | 4.85 | 10.36% | 9.99 | 10.4 | 4.11% | 20% |

POWER SUPPLY SYSTEM AND METHOD OF CONTROLLING THE SAME

BACKGROUND

Technical Field

The present disclosure relates to a power supply system and a method of controlling the same, and more particularly a power supply system suitable for asymmetrical parallel connection and a method of controlling the same.

Description of Related Art

The statement in this section merely provides background information related to the present disclosure and do not necessarily constitute prior art.

Due to the increasing popularity of data networking nowadays, more and more data needs to be stored using devices such as servers. Since the server is a critical load, it must be operated without interruption. Therefore, the power supplying the server must have an uninterrupted power supply and can meet the load current requirements at any time. Accordingly, the design of the power supply system for the server has also been paid more and more attention.

At present, the power module is used in the server system, all of which need to meet the function of M+N parallel redundancy. The basic requirements for power modules are the same input potential, the same output potential and the same total output power to provide a parallel-connected average-current power supply mode, and when one power module fails, the power supply capacity of other power modules can still meet the load demand. The power modules certified for use in server systems are usually designed and manufactured by more than one supplier, and rules for parallel use of power modules in the early days were not complicated. Since the use environment and dynamic response requirements are not severe, the main consideration are current sharing and accuracy that were valued by the parallel technology at that time.

Under this consideration, the parallel system is simple and direct, and can only accept power modules of the same level and specifications to supply power in parallel in the system, which limits the flexible design of the server power supply system. Under this algorithm, the power module must be recognized by the operating system, including: 1. power module serial number (SN). 2. field replace unit (FRU) for power modules. 3. identity authentication (ID) of the power module. When the server system uses two or more power modules, the system BIOS will read the above three information and interpret the information. When the above three sets of information are mismatching from the original settings, the system will issue a warning and will not allow startup power.

However, since the server system usually needs a large numbers of power modules to supply the power, under some special conditions, it is difficult to provide power modules with the same specifications for the power supply system of the server. Therefore, the present disclosure is to provide a power supply system and a method of controlling the same to change the traditional method to only limit the parallel connection of models of the same model and the same output power, and provide the maximum parallel power, increase the server system to have more power module options and greater parallel system benefits.

SUMMARY

In order to solve the above-mentioned problems, the present disclosure provides a power supply system. The power supply system includes a plurality of power modules for supplying power to a load. Each power module includes a conversion circuit, a current sensing unit, a signal amplifying unit, a current sharing unit, and a controller. The conversion circuit provides an output current according to a modulation signal, and provides the output current to a power bus through an output end and supply the output current to the load through the power bus. The current sensing unit is coupled to the output end, and senses the output current to generate a first voltage level. The signal amplifying unit is coupled to the current sensing unit, and provides an amplified signal according to the first voltage level. The current sharing unit is coupled to the signal amplifying unit, and receives the amplified signal. The controller is coupled to the current sensing unit, the signal amplifying unit, and the current sharing unit, and adjusts the modulation signal according to the amplified signal. The current sharing unit of each power module is commonly connected to a common-connected point of a signal bus to generate a second voltage level at the common-connected point; the controller acquires a first ratio according to a full-load output power of the conversion circuit corresponding to the controller and the full-load output power of the power module capable of outputting the maximum power, adjusts the first voltage level according to the first ratio and the second voltage level to adjust the amplified signal by adjusting the first voltage level, and adjusts the output current to a target value corresponding to the first ratio by adjusting the amplified signal.

In one embodiment, the second voltage level is an average value of the summed amplified signals of the power modules.

In one embodiment, the current sharing unit includes a buffer and a resistor. The buffer is coupled to the signal amplifying unit. The resistor is coupled to the buffer and the common-connected point. The second voltage level is a voltage across the resistor.

In one embodiment, a second ratio of the output current of each power module is equal to the first ratio of each power module.

In one embodiment, the controller sets a maximum value of the first voltage level to a fixed value, and the fixed value corresponds to the first voltage level of the power module with the largest of the full-load output power operated at full-load output.

In one embodiment, an output voltage of the conversion circuit is responsive to the output current, and the controller adjusts the modulation signal according to the output voltage and the amplified signal.

In one embodiment, when the power module with the largest of the full-load output power fails, the power supply system still meets a full-load requirement of the load.

In order to solve the above-mentioned problems, the present disclosure provides a method of controlling a power supply system for controlling a plurality of power modules to supply power to a load. The method includes steps of: controlling a conversion circuit of each power module to provide an output current according to a modulation signal, sensing the output current to generate a first voltage level, and providing an amplified signal according to the first voltage level, adjusting the modulation signal according to the amplified signal, and generating a second voltage level according to an average value of the summed amplified signals of the power modules, acquiring a first ratio by each power module according to the full-load output power of the conversion circuit and the full-load output power of the power module that outputs the maximum power, and adjusting the first voltage level according to the first ratio and the second voltage level to adjust the amplified signal so as to adjust the output current to a target value.

In one embodiment, further includes steps of: acquiring a fixed value of the first voltage level when the power module with the largest of the full-load output power is operated at full-load output, and setting the maximum value of the first voltage levels of the other power modules at the fixed value.

In one embodiment, further includes steps of: separately detecting an output voltage of each power module, and respectively adjusting the modulation signal according to the output voltage and the amplified signal.

The main purpose and effect of the present disclosure is that each power module of the power supply system of the present disclosure can acquire the corresponding proportional relationship of the full-load output power according to the full-load output power of the conversion circuit and the full-load output power of the power module that can output the maximum power. According to the proportional relationship of the full-load output power of the power module, the output current that needs to be shared by itself is adjusted so as to distribute the output current of each power module in the same proportion as the proportional relationship of the full-load output power of the power modules.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
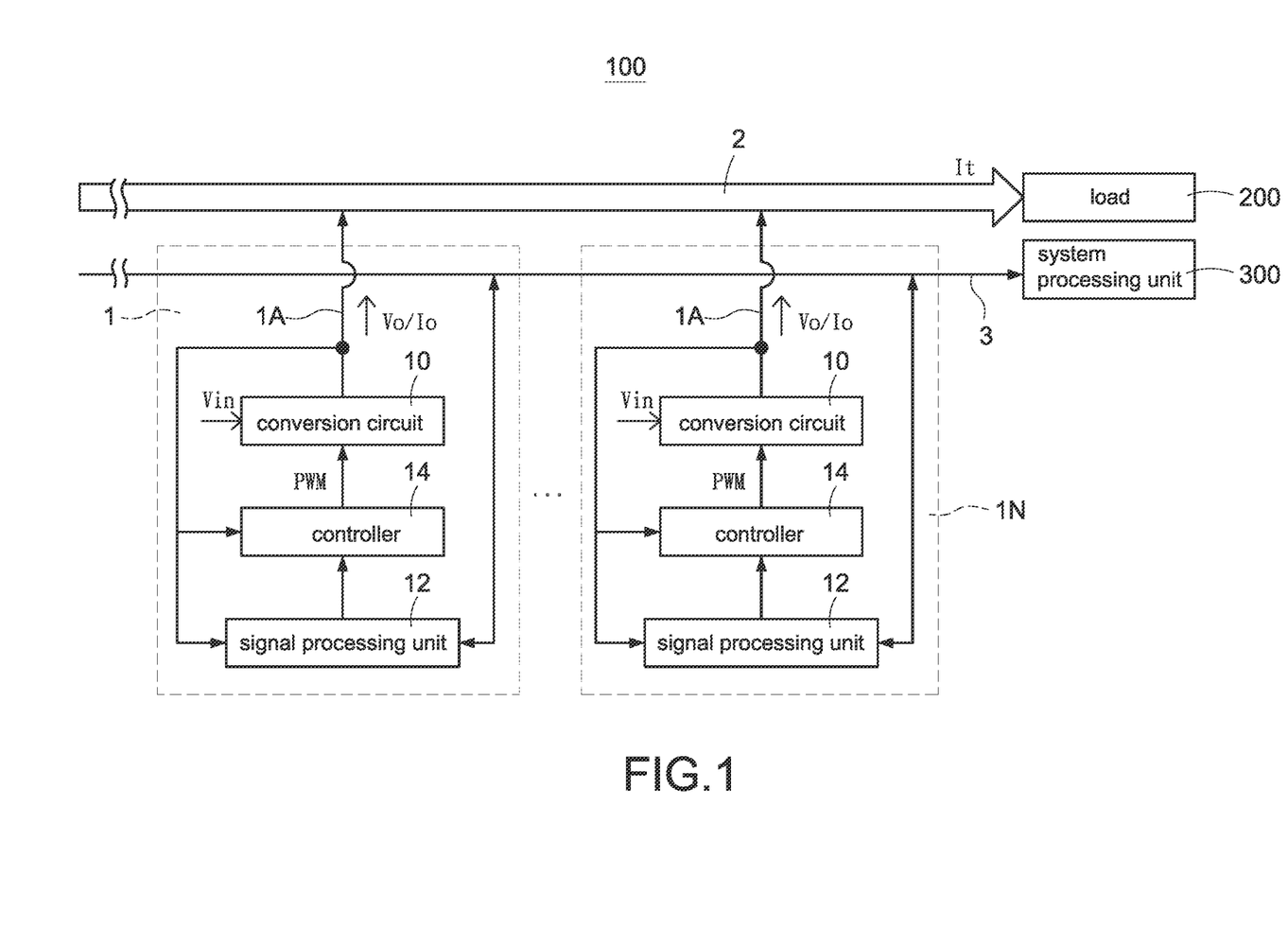
FIG. 1 is a block circuit diagram of a power supply system suitable for asymmetrical parallel connection according to the present disclosure.

Please refer to FIG. 1, which shows a block circuit diagram of a power supply system suitable for asymmetrical parallel connection according to the present disclosure. The power supply system 100 includes a plurality of power modules 1-1N (two power modules are illustrated in this embodiment), a power bus 2, and a signal bus 3. The power modules 1-1N are coupled to a load 200 through the power bus 2, and coupled to a system processing unit 300 through the signal bus 3, for example, but not limited to, an arithmetic processing device such as a central processing unit, a microcontroller, a digital signal processor, or so on. The power modules 1-1N provide output voltages Vo through the power bus 2, and provide output currents Io in response to the current drawn from the load 200. The system processing unit 300 communicates with the power modules 1-1N through the signal bus 3, and the power output required by each power module 1-1N is allocated according to the requirement of the load 200 and the capability of each power module 1-1N, thereby maintaining stable operation of load 200. Each power module 1-1N also shares its operation condition through the signal bus 3 so as to adaptively adjust its own output.

Specifically, the load 200 may be a critical load (such as, but not limited to, servers, switches, base station equipment, etc.), and the power supply system 100 is mainly a redundant power supply system (i.e., an M+N parallel redundant power supply system) to provide uninterrupted power supply requirements for critical loads. In particular, a total demand current It is the sum of the output currents Io of all power modules 1-1N. When each power module 1-1N of the power supply system 100 is normal, the system processing unit 300 controls the power modules 1-1N outputting the power in equal proportions according to the full-load output power of each power module 1-1N, to share the total demand current It required by the load 200 in equal proportions (for example, but not limited to, the 1000-watt power module and the 500-watt power module are both half-output loads, that is, two power modules deliver half its maximum output power). Each power module 1-1N may also be operated under the output condition of high conversion efficiency. When any one of power supply modules 1-1N fails, other power supply modules 1-1N can immediately take over its work so as to avoid the risk of being unable to meet the operational demands of the load 200.

Please refer to FIG. 1 again, each power module 1-1N includes a conversion circuit 10, a signal processing unit 12, and a controller 14. The conversion circuit 10 receives an input voltage Vin, converts the input voltage Vin into an output voltage Vo according to a modulation signal PWM so as to provide the output voltage Vo and the output current Io to output ends 1A of the power modules 1-1N. The output end 1A of each power module 1-1N is coupled to the power bus 2, and the output voltage Vo and the output current Io of each power module 1-1N can be supplied to the power bus 2 through the output end 1A so as to be supplied to the load 200 through the power bus 2 to maintain the stable operation of the load 200. In particular, the magnitude of the output current Io is determined according to the current drawn from the load 200 (i.e., the total demand current It) and the distribution of the power supply system 100, and it usually maintains that each power module 1-1N can share in equal proportions. The signal processing unit 12 is coupled to the signal bus 3, and the controller 14 is coupled to the conversion circuit 10 and the signal processing unit 12. The signal processing unit 12 communicates with the system processing unit 300 through the signal bus 3, and shares information with the power modules 1-1N through the signal bus 3. In particular, the conversion circuit 10 may be a switching isolated/non-isolated power converter (for example, but not limited to a flyback converter, etc.), and the controller 14 may be an arithmetic processing device, for example, but not limited to, a central processing unit, a microcontroller, a digital signal processor.

The controller 14 realizes the command to be controlled by the system processing unit 300 through the signal processing unit 12, and transmits its own information as a reference or criterion for the system processing unit 300 to perform subsequent control. The controller 14 also shares information with the other power modules 1-1N through the signal processing unit 12 so that each of the power modules 1-1N can realize the status of each other and adaptively adjust its own output. Moreover, the controller 14 mainly provides the modulation signal PWM to control the conversion circuit 10 to convert the output voltage Vo and the output current Io. In addition, the controller 14 adjusts the modulation signal PWM through the feedback signal of the output end 1A and the signal provided by the signal processing unit 12 so as to adjust the output voltage Vo and the output current Io output by the conversion circuit 10 by adjusting the modulation signal PWM.

Figure 2:
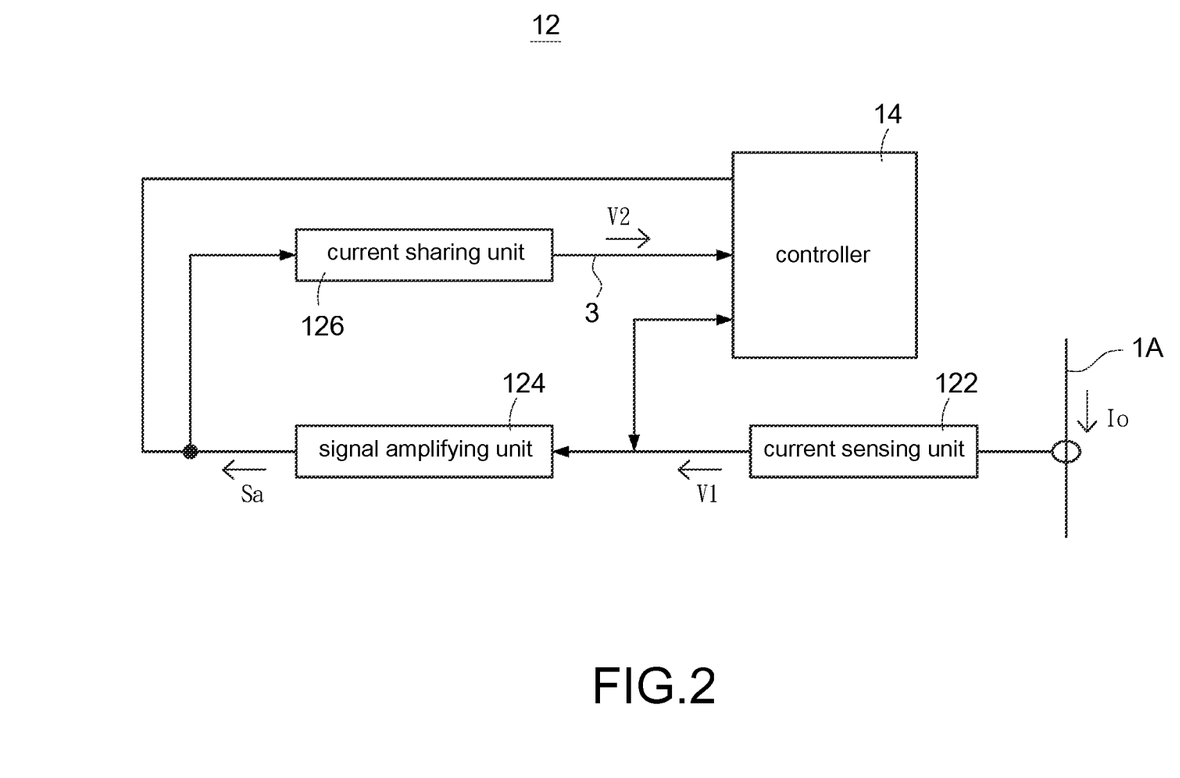
FIG. 2 is a block circuit diagram of a signal processing unit according to the present disclosure.

Please refer to FIG. 2, which shows a block circuit diagram of a signal processing unit according to the present disclosure, and also refer to FIG. 1. The signal processing unit 12 includes a current sensing unit 122, a signal amplifying unit 124, and a current sharing unit 126. An input end of the current sensing unit 122 is coupled to the output end 1A to sense the output current Io to generate a first voltage level V1. An output end of the current sensing unit 122 is coupled to the controller 14 so that the controller 14 can realize the magnitude of the output current Io by receiving the first voltage level V1. In particular, the output end of the current sensing unit 122 may be also coupled to the system processing unit 300 and other power modules 1-1N through the signal bus 3 so as to share the first voltage level V1 for the system processing unit 300 or other power modules 1-1N to interpret.

The signal amplifying unit 124 is coupled to the output end of the current sensing unit 122 and provides an amplified signal Sa according to the first voltage level V1. The signal amplifying unit 124 modulates (amplifies) the first voltage level V1 into the amplified signal Sa, which also corresponds to the magnitude of the output current Io, according to the signal level required by the power supply system 100. The output end of the signal amplifying unit 124 is coupled to the controller 14 to provide the amplified signal Sa to the controller 14. The controller 14 further utilizes the amplified signal Sa and the signal corresponding to the output voltage Vo measured at the same time to perform pulse wave modulation through a pulse width modulation module (not shown) of the controller 14 to adjust the modulation signal PWM.

The output end of the signal amplifying unit 124 also provides the amplified signal Sa to the system processing unit 300 or other power modules 1-1N by being coupled to the signal bus 3 so as to share the amplified signal Sa for the system processing unit 300 or other power modules 1-1N to interpret. Furthermore, since the adjustment of the output voltage Vo will affect the magnitude of the output current Io (that is, the output voltage Vo responds for the output current Io), the controller 14 adjusts the modulation signal PWM according to the output voltage Vo and the amplified signal Sa so as to control the output current Io by adjusting the output voltage Vo to meet the requirement of proportional distribution among each power module 1-1N.

An input end of the current sharing unit 126 is coupled to the signal amplifying unit 124 and receives the amplified signal Sa. An output end of the current sharing unit 126 is coupled to the signal bus 3 and the controller 14 and generates a second voltage level V2 at the output end. Specifically, the output ends of the current sharing units 126 of the power modules 1-1N are connected to a common-connected point of the signal bus 3 so that the second voltage level V2 on the common-connected point is the averaged voltage level. In general, the controller 14 adjusts the first voltage level V1 according to the averaged second voltage level V2 so as to adjust the amplified signal Sa by adjusting the first voltage level V1. Therefore, the controller 14 can adjust the output current Io according to the signal corresponding to the adjusted amplified signal Sa and the output voltage Vo.

The main purpose and effect of the present disclosure is that the controller 14 can acquire a first ratio according to the full-load output power of the conversion circuit 10 and the full-load output power of the power modules 1-1N capable of outputting the maximum power. In particular, the first ratio represents the proportional relationship of the full-load output power between this power module 1-1N and the power module 1-1N with the maximum power. In addition to adjusting the first voltage level V1 according to the second voltage level V2 to equally share the output current Io by the power modules 1-1N, the controller 14 also adjusts the output current Io to be shared in the same proportion as the proportional relationship of the full-load output power of the power modules 1-1N.

Specifically, in addition to adjusting the first voltage level V1 according to the second voltage level V2, the controller 14 also adjusts the first voltage level V1 according to the first ratio corresponding to the full-load output power so that the power supply system 100 can provide the output current Io asymmetrically according to the difference of the full-load output power. Therefore, the power supply system 100 can adjust the output current Io of each power module 1-1N in equal proportion, instead of adjusting the output current Io of each power module 1-1N in a way of evenly sharing as in the prior art.

In particular, the controller 14 has various ways to realize the full-load output power of the power modules 1-1N and the corresponding first ratio. For example, but not limited to, the system processing unit 300 communicates with the controller 14 of each of the power modules 1-1N to realize the full-load output power that each of the power modules 1-1N can provide and its corresponding first ratio. Alternatively, the controller 14 of each of the power modules 1-1N communicates with each other to realize each other's load output power and its corresponding first ratio. Also, it is even possible to perform a pull-up test at startup to realize each other's load output power and its corresponding first ratio by detecting the output voltage Vo and output current Io.

Figure 3:
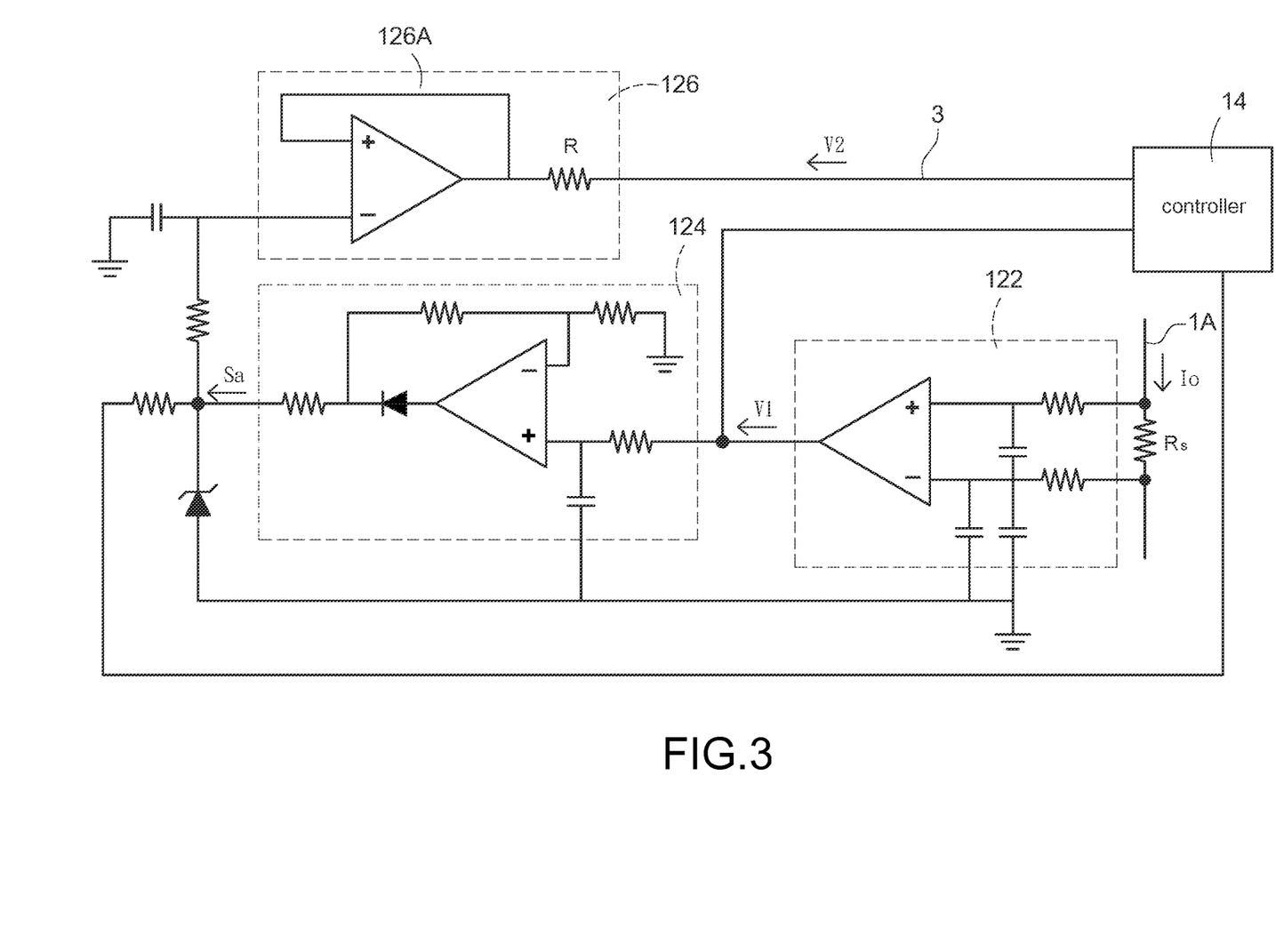
FIG. 3 is a detailed block circuit diagram of the signal processing unit according to the present disclosure.

Please refer to FIG. 3, which shows a detailed block circuit diagram of the signal processing unit according to the present disclosure, and also refer to FIG. 1 to FIG. 2. In one embodiment, the signal processing unit 12 shown in FIG. 2 may be implemented by the firmware or software program inside the controller 14, and also be implemented by using a circuit formed by electronic components. FIG. 3 shows an embodiment in which the signal processing unit 12 is constituted by a circuit. The current sensing unit 122 uses a current sensing circuit, that is, a current sensing resistor Rs is used to couple to the output end 1A, and both ends of the sensing resistor Rs is coupled to an error amplifier to generate the first voltage level V1 corresponding to the output current Io. In particular, the current sensing unit 122 may be also directly replaced by a current sensing device, such as a current sensor.

The signal amplifying unit 124 may be implemented by a forward or reverse amplifying circuit composed of operational amplifiers so as to modulate (amplify) the first voltage level V1 into the amplified signal Sa. In particular, the forward or reverse direction of the amplifying circuit is mainly determined according to the requirements of the back end, such as the controller 14 or the system processing unit 300, and depends on the type of signal that it can accept. The current sharing unit 126 may be a voltage follower circuit composed of an operational amplifier, and has the function of providing the amplified signal Sa to the input end of the current sharing unit 126 and isolating the input end and the output end. Specifically, the current sharing unit 126 may include a buffer 126A composed of an operational amplifier and a resistor R.

The buffer 126A is coupled to the signal amplifying unit 124, and the resistor R is coupled to the buffer 126A and the common-connected point of the signal bus 3. Since the current sharing unit 126 of each of the power modules 1-1N includes a resistor R, and the resistor R is coupled to the common-connected point of the signal bus 3, the amplified signal Sa provided by each of the power modules 1-1N will be summed up at the common-connected point to acquire an average value, and a cross voltage across the resistor R, and the cross voltage will be the second voltage level V2. In one embodiment, all circuits/components that have isolated input/output ends and transmit signals to the output ends (such as, but not limited to, optical coupling circuits, buffer gates, etc., and the function of scaling is not excluded) can be used as the buffer 126A. In one embodiment, a buffer may also be included between the current sensing unit 122 and the signal amplifying unit 124 to isolate the actual value of the first voltage level V1 detected by the current sensing unit 122 from the first voltage level V1 adjusted by the controller 14 to avoid affecting the accuracy of the first voltage level V1 received by the signal amplifying unit 124 due to fluctuation in the analog detection.

Please refer to FIG. 1 to FIG. 3 again, take two power modules 1-1N with different full-load output power connected in parallel as an example. If the full-load output power of one is 1000 watts and the full-load output power of the other is 500 watts, the controllers 14 of the two power modules realize the full-load output power of each other and their corresponding first ratio (i.e., 2:1). The power module with 1000 watts sets the maximum value of the first voltage level V1 at a fixed value (assuming 4 volts) at full-load output (100%), and the power module with 500 watts also sets the maximum value of the first voltage level V1 at a fixed value corresponding to the full-load output power of the power module with 1000 watts. Although the wattage is only half of 1000 watts and the maximum value is only 2 volts, the controller 14 also sets the maximum value of the first voltage level V1 to 4 volts. Therefore, when the power supply system 100 starts to demand to supply power to the load 200, the controller 14 of the power module with 500 watts will convert the first voltage level V1 to be the same as that of the power module with 1000 watts according to the proportional relationship (i.e., the first ratio).

For example, but not limited to, assuming that the first voltage level V1 measured by the current sensing unit 122 of the power module with 500 watts is 1 volt (representing those 500 watts is half-load (50%) output power), the controller 14 of the power module with 500 watts converts the 1-volt first voltage level V1 to 2 volts according to a proportional relationship. Therefore, the power modules with 1000 watts and 500 watts can be synchronized to the same output power due to the proportional conversion of the first voltage level V1. Also, the second voltage level V2 on the common-connected point is an average voltage level, i.e., voltage levels generated at output ends of the current sharing units 126 are summed and averaged to acquire the second voltage level V2. Assuming that the amplified signal Sa of the power module with 1000 watts represents 60% of output power, and the amplified signal Sa of the power module with 500 watts represents 40% of output power, the second voltage level V2 of the common-connected point will represent the voltage level that is summed and averaged (that is, 50% of output power).

The controllers 14 of the power modules with 1000 watts and 500 watts then adjust the first voltage level V1 according to the second voltage level V2 (that is, the value corresponding to 60% and 40% is adjusted to a value of 50%) so as to adjust the amplified signal Sa by adjusting the first voltage level V1, and control the corresponding conversion circuit 10 to provide the output current Io through the adjusted amplified signal Sa. Therefore, the output current Io provided by the power module with 1000 watts is twice that of the power module with 500 watts. Therefore, the second ratio (i.e., 2:1) of the output current Io outputted by power modules with 1000 watts and 500 watts is equal to the first ratio (i.e., 2:1) of the power module. That is, the load 200 can draw the asymmetric and uneven output current Io from the power supply system 100, without unifying the specifications of all power modules. On the other hand, if two power supply modules 1-1N with the same full-load output power are connected in parallel, the maximum value of the first voltage level V1 of the two is the same, and therefore two power modules 1-1N with the same full-load output power can also use the circuit structure of the present disclosure to perform the traditional average current control method. In particular, since the power supply system 100 of the present disclosure focuses on M+N parallel redundant power supply system, no matter which one of power modules 1-1N fails, other power modules 1-1N can still take over its work immediately. Therefore, under the condition that the full-load output power is different, the power supply system 100 is configured so that when one of the power modules 1-1N with the largest full-load output power fails (assuming 1000 watts), the power supply system 100 still meets the full-load requirement of the load 200 so as to meet the requirements of the M+N parallel redundant power supply system.

It should be further noted that the conventional power supply system cannot provide the asymmetric and uneven output current Io in response to the difference in the full-load output power of power modules 1-1N. Therefore, when the full-load output power of power modules 1-1N is different, the first voltage level V1 is not adjusted according to the first ratio, resulting that when the power module with 1000 watts being drawn 50% of the output current Io, the power module with 500 watts will be forced to provide 100% of the output current Io since the full-load output power is only half of that of 1000 watts. Accordingly, it cannot meet the requirement of the power supply system 100 to draw the output current Io in equal proportion according to the difference in full-load output power.

Figure 4:
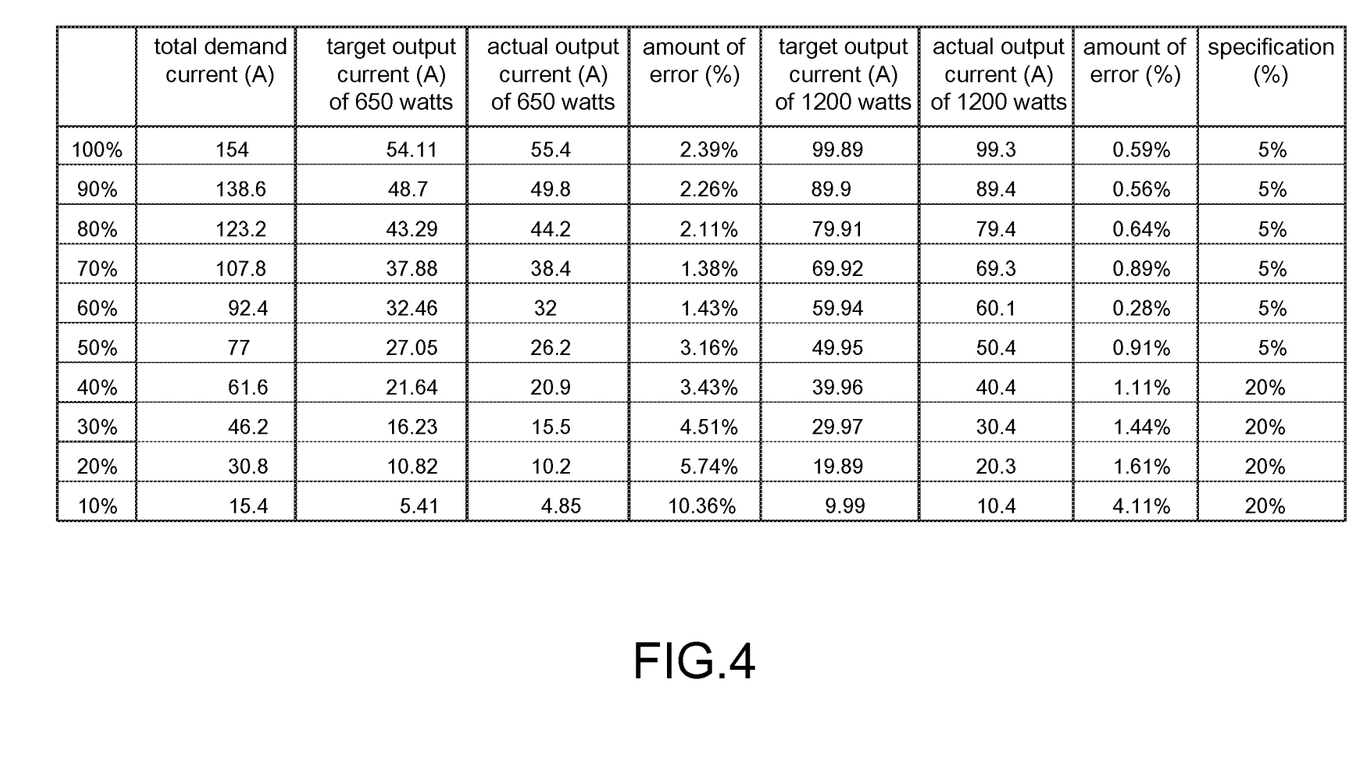
FIG. 4 is a schematic diagram of the parallel connection data of power modules with 650 watts and 1200 watts used in the power supply system according to the present disclosure.

Please refer to FIG. 4, which shows a schematic diagram of the parallel connection data of power modules with 650 watts and 1200 watts used in the power supply system according to the present disclosure. Use the value indicated in the first row (100%) and the sixth row (50%) to illustrate. When the total demand current It drawn from the load 200 is 154 amps, the respective output currents Io of the power modules with 650 watts and 1200 watts are 55.4 amps (650 watts) and 99.3 amps (1200 watts), and the total is close to the demanded 154 amps, and the error values are 2.39% and 0.59% respectively. Therefore, there is still a considerable margin (+/−3%) compared to the +/−5% requirement of the original specification, and it can be seen that the design meets the parallel-connected current sharing specification of the power supply system 100. On the other hand, when the total demand current It drawn from the load 200 is 77 amps, the respective output currents Io of the power modules with 650 watts and 1200 watts are 26.2 amps (650 watts) and 50.4 amps (1200 watts), and the total is close to the demanded 77 amps, and the error values are 3.16% and 0.91% respectively. Therefore, there is still a considerable margin (+/−2%) compared to the +/−5% requirement of the original specification, and it can be seen that the design meets the parallel-connected current sharing specification of the power supply system 100.

However, in the conventional power supply system, there is no control method for drawing the asymmetrical and uneven output current Io. Therefore, under the condition that the load is 100%, the current drawn from the power module with 650 watts for the load 200 may cause an overload situation, which may cause the power module with 650 watts to fail and cause the entire system to become unstable. Under the condition that the load is 50%, the current drawn from power modules with 650 watts and 1200 watts are averaged according to the number of power modules. Therefore, the current drawn from the power module with 650 watts exceeds half load (roughly 70% of 650 watts), and the current drawn from the power module with 1200 watts is less than half load (roughly 40% of 1200 watts), which cannot achieve effect of drawing the output current Io of each power module 1-1N in equal proportion according to the full-load output power of each power module 1-1N.

Figure 5:
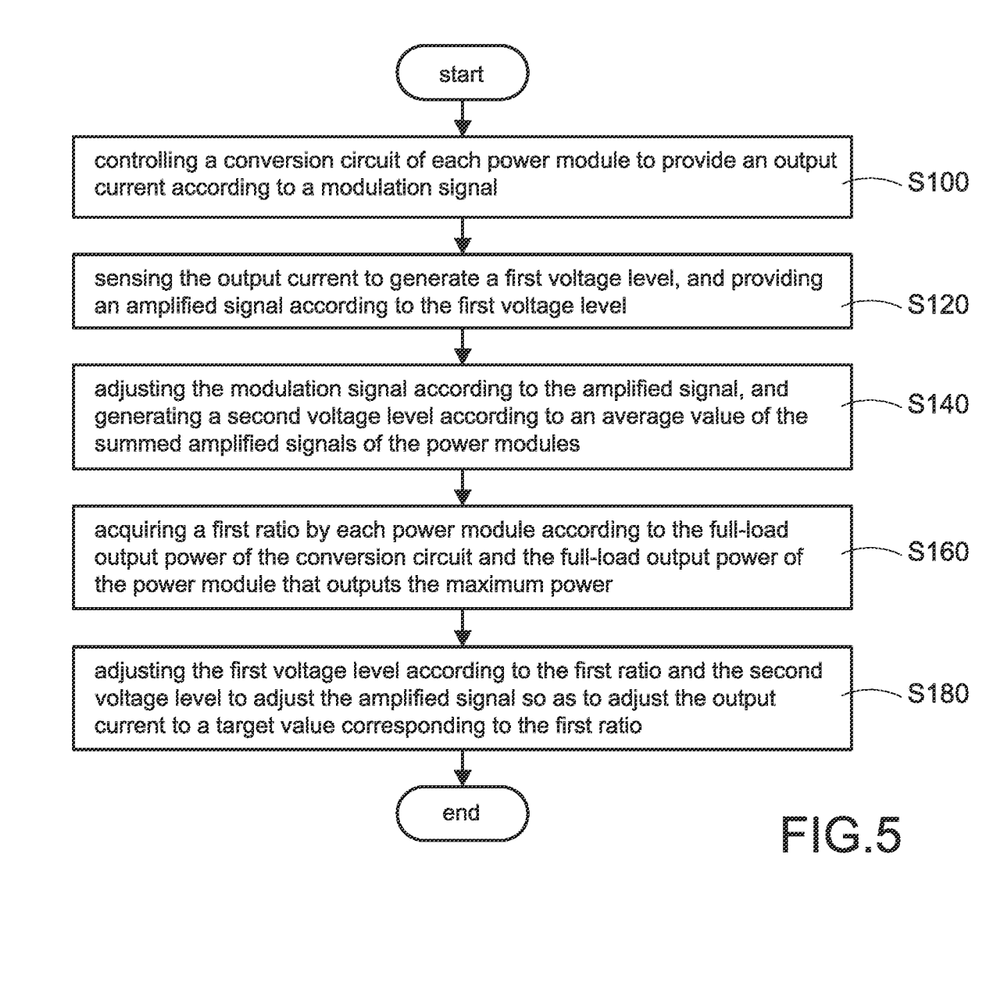
FIG. 5 is a flowchart of a method of controlling a power supply system according to the present disclosure.

Please refer to FIG. 5, which shows a method of controlling the power supply system according to the present disclosure, and also refer to FIG. 1 to FIG. 4. The method of controlling the power supply system is to draw the output current Io of the plurality of power modules 1-1N in equal proportion according to the difference of the full-load output power of the power modules 1-1N. The method includes steps of: controlling a conversion circuit of each power module to provide an output current according to a modulation signal (S100). Each power module 1-1N includes a conversion circuit 10, and the conversion circuit 10 converts the input voltage Vin into an output voltage Vo according to a modulation signal PWM so as to provide the output voltage Vo and the output current Io to output ends 1A of the power modules 1-1N. Afterward, sensing the output current to generate a first voltage level, and providing an amplified signal according to the first voltage level (S120). Specifically, the output current Io is sensed by the current sensing unit 122 to generate the first voltage level V1, and the signal amplifying unit 124 is used to modulate (amplify) the first voltage level V1 into an amplified signal Sa corresponding to the magnitude of the output current Io.

Afterward, adjusting the modulation signal according to the amplified signal, and generating a second voltage level according to an average value of the summed amplified signals of the power modules (S140). Specifically, the controller 14 performs pulse wave modulation through the pulse width modulation module (not shown) of the controller 14 according to the signal corresponding to the amplified signal Sa and the output voltage Vo measured at the same time to adjust the modulation signal PWM. The current sharing unit 126 of each of the power modules 1-1N is connected to the common-connected point to generate the second voltage level V2 that is summed and averaged according to the amplified signal Sa. Afterward, acquiring a first ratio by each power module according to the full-load output power of the conversion circuit and the full-load output power of the power module that outputs the maximum power (S160). Specifically, the controller 14 realizes the full-load output power of the power modules 1-1N by communicating with the power modules 1-1N or with the system processing unit 300, or by detecting the full-load output power of the power modules 1-1N so that the first ratio is acquired according to the full-load output power of the conversion circuit 10 and the full-load output power of the power modules 1-1N capable of outputting the maximum power.

Finally, adjusting the first voltage level according to the first ratio and the second voltage level to adjust the amplified signal so as to adjust the output current to a target value corresponding to the first ratio (S180). Specifically, the controller 14 not only adjusts the first voltage level V1 according to the second voltage level V2, but also adjusts the first voltage level V1 according to the first ratio corresponding to the full-load output power so as to convert the maximum value of the first voltage level V1 of each power module 1-1N according to the proportional relationship to synchronize the output power of each power module 1-1N to the same output power so that the power supply system 100 can provide the output current Io asymmetrically according to the difference of the full-load output power. In one embodiment, detailed steps of the above-mentioned method can be referred to FIG. 2 to FIG. 3, and the detail description is omitted here for conciseness.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply system, comprising a plurality of power modules for supplying power to a load, and each power module comprising:
   a conversion circuit, configured to provide an output current according to a modulation signal, and provide the output current to a power bus through an output end and supply the output current to the load through the power bus,
   a current sensing unit, coupled to the output end, and configured to sense the output current to generate a first voltage level,
   a signal amplifying unit, coupled to the current sensing unit, and configured to provide an amplified signal according to the first voltage level,
   a current sharing unit, coupled to the signal amplifying unit, and configured to receive the amplified signal, and
   a controller, coupled to the current sensing unit, the signal amplifying unit, and the current sharing unit, and configured to adjust the modulation signal according to the amplified signal,
   wherein the current sharing unit of each power module is commonly connected to a common-connected point of a signal bus to generate a second voltage level at the common-connected point; the controller acquires a first ratio according to a full-load output power of the conversion circuit corresponding to the controller and the full-load output power of the power module capable of outputting the maximum power, adjusts the first voltage level according to the first ratio and the second voltage level to adjust the amplified signal by adjusting the first voltage level, and adjusts the output current to a target value corresponding to the first ratio by adjusting the amplified signal.

2. The power supply system as claimed in claim 1, wherein the second voltage level is an average value of the summed amplified signals of the power modules.

3. The power supply system as claimed in claim 1, wherein the current sharing unit comprises:
   a buffer, coupled to the signal amplifying unit, and
   a resistor, coupled to the buffer and the common-connected point,
   wherein the second voltage level is a voltage across the resistor.

4. The power supply system as claimed in claim 1, wherein a second ratio of the output current of each power module is equal to the first ratio of each power module.

5. The power supply system as claimed in claim 1, wherein the controller sets a maximum value of the first voltage level to a fixed value, and the fixed value corresponds to the first voltage level of the power module with the largest of the full-load output power operated at full-load output.

6. The power supply system as claimed in claim 1, wherein an output voltage of the conversion circuit is responsive to the output current, and the controller adjusts the modulation signal according to the output voltage and the amplified signal.

7. The power supply system as claimed in claim 1, wherein when the power module with the largest of the full-load output power fails, the power supply system still meets a full-load requirement of the load.

8. A method of controlling a power supply system, configured for controlling a plurality of power modules to supply power to a load, the method comprising steps of:
   controlling a conversion circuit of each power module to provide an output current according to a modulation signal,
   sensing the output current to generate a first voltage level, and providing an amplified signal according to the first voltage level,
   adjusting the modulation signal according to the amplified signal, and generating a second voltage level according to an average value of the summed amplified signals of the power modules,
   acquiring a first ratio by each power module according to the full-load output power of the conversion circuit and the full-load output power of the power module that outputs the maximum power, and
   adjusting the first voltage level according to the first ratio and the second voltage level to adjust the amplified signal so as to adjust the output current to a target value.

9. The method as claimed in claim 8, further comprising steps of:
   acquiring a fixed value of the first voltage level when the power module with the largest of the full-load output power is operated at full-load output, and
   setting the maximum value of the first voltage levels of the other power modules at the fixed value.

10. The method as claimed in claim 8, further comprising steps of:
    separately detecting an output voltage of each power module, and
    respectively adjusting the modulation signal according to the output voltage and the amplified signal.

* * * * *